United States Patent [19]
Terada

[11] Patent Number: 5,177,726
[45] Date of Patent: Jan. 5, 1993

[54] APPARATUS FOR RECORDING INFORMATION ON AND/OR REPRODUCING INFORMATION FROM OPTICAL DISC INCLUDING FOCUS SERVO INITIALIZATION USING WOBBLE PITS

[75] Inventor: Akio Terada, Tokyo, Japan

[73] Assignee: Sony Corporation, Tokyo, Japan

[21] Appl. No.: 681,321

[22] Filed: Apr. 4, 1991

[30] Foreign Application Priority Data

Apr. 5, 1990 [JP] Japan .................................. 2-091182

[51] Int. Cl.[5] .............................................. G11B 7/095
[52] U.S. Cl. ............................ 369/44.270; 369/44.34; 369/54
[58] Field of Search .................... 369/13, 44.25-44.29, 369/44.32, 44.34, 44.35, 44.41, 54

[56] References Cited

U.S. PATENT DOCUMENTS

| | | | |
|---|---|---|---|
| 4,860,271 | 8/1989 | Yokogawa et al. | 369/44.25 X |
| 4,866,688 | 9/1989 | Ohtake et al. | 369/44.28 X |
| 5,031,166 | 7/1991 | Getreuer et al. | 369/44.34 X |
| 5,034,940 | 7/1991 | Saito et al. | 369/44.34 |
| 5,097,458 | 3/1992 | Suzuki | 369/44.34 |
| 5,099,468 | 3/1992 | Suzuki et al. | 369/44.32 |
| 5,113,384 | 5/1992 | McDonald et al. | 369/44.34 X |

Primary Examiner—Wayne R. Young
Attorney, Agent, or Firm—Philip M. Shaw, Jr.

[57] ABSTRACT

An optical disc such as a magnetooptic disc has information storage tracks each associated with a plurality of pairs of wobble pits arranged therealong. A light beam emitted from a light beam source such as a semiconductor laser is applied as a convergent light beam through an objective lens to the optical disc. A deviation of the light beam from a focused condition on the optical disc is detected as a focus error. A light beam returning from the optical disc is detected by a light detector. When the light beam returns from the wobble pits in each pair, the light detector produces a detected signal with successive peak values corresponding to the wobble pits, and the peak values are averaged. The objective lens is moved along its optical axis by an actuator based on the sum of a signal representing the focus error and a bias which maximizes the absolute value of the average of the peak values from the light detector.

8 Claims, 10 Drawing Sheets

APPARATUS FOR RECORDING INFORMATION ON AND/OR REPRODUCING INFORMATION FROM OPTICAL DISC INCLUDING FOCUS SERVO INITIALIZATION USING WOBBLE PITS

BACKGROUND OF THE INVENTION

1. Field of the Invention

The present invention relates to an apparatus for recording information on and/or reproducing information from an optical disc which may an ordinary optical disc or a magnetooptic disc.

2. Description of the Prior Art

Figure 1:
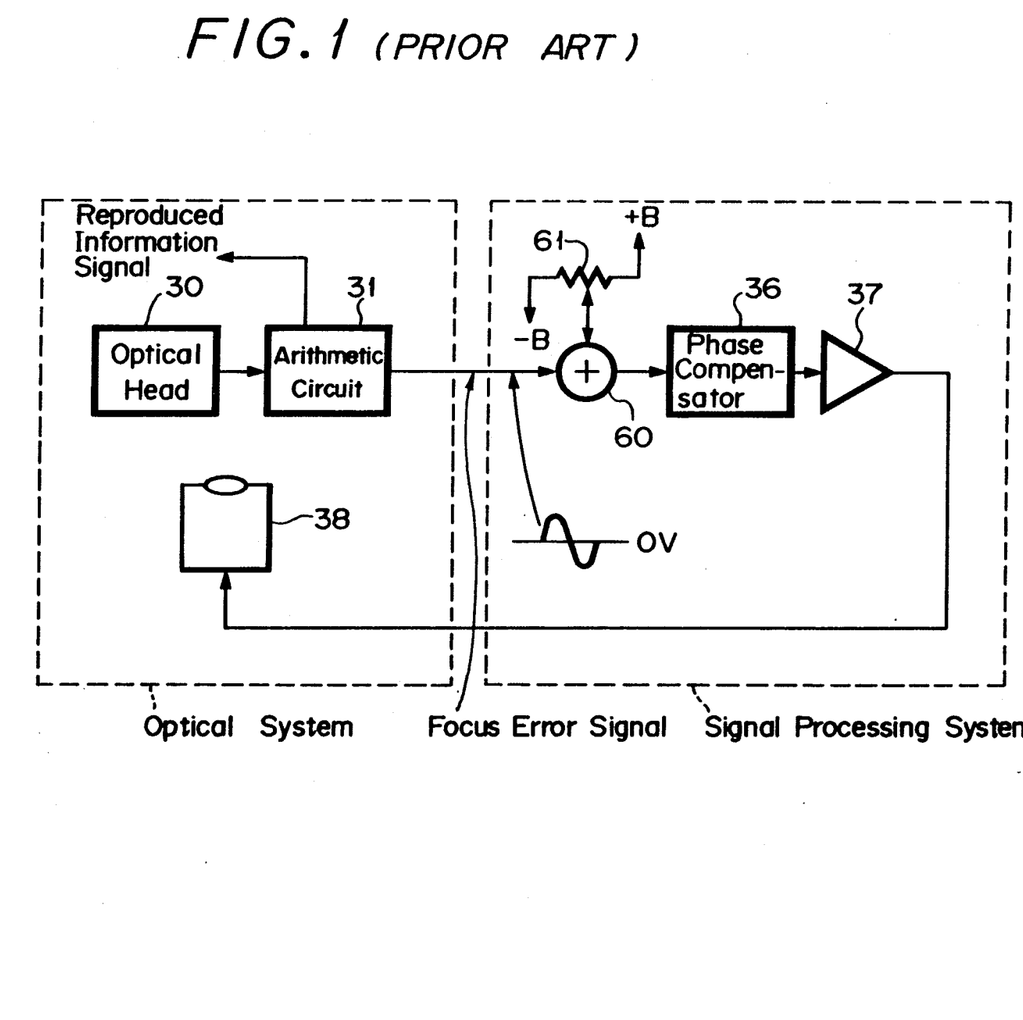
FIG. 1 is a block diagram of a conventional apparatus for reproducing information from an optical disc.

FIG. 1 of the accompanying drawings shows a conventional apparatus for reproducing recorded information from an optical disc.

In FIG. 1, an optical head 30 applies a laser beam to an optical disc (not shown) which stores recorded information. The applied laser beam is reflected by the optical disc while being modulated by the recorded information, and detected by the optical head 30. A detected signal from the optical head 30 is processed by a arithmetic circuit 31, which produces a reproduced information signal and an focus error signal represented by an S-shaped characteristic curve. The focus error signal from the arithmetic circuit 31 is applied to an adder 60, by which it is added to a voltage from a rheostat 61. The rheostat 61 has one terminal connected to a positive power supply +B and another terminal to a negative power supply −B.

The adder 60 generates a sum output signal which is applied as a control voltage signal through a phase compensator 36 and a buffer amplifier 37 to a focus actuator 38. The focus actuator 38 moves the objective lens (not shown) of the optical head 30 along its optical axis over an interval depending on the voltage represented by the control voltage signal, until the laser beam emitted from the optical head 30 is sharply focused on the optical disc.

The optical head 30, the arithmetic circuit 31, and the focus actuator 38 jointly serve as an optical system, whereas the adder 60, the rheostat 61, the phase compensator 36, and the buffer amplifier 37 jointly constitute a signal processing system. The optical system and the signal processing system are generally mounted on different printed-circuit boards, respectively.

The conventional information reproducing apparatus shown in FIG. 1 require manual adjustments for higher focus servo accuracy. More specifically, while the information recorded on an optical disc is being detected by the optical head 30, the probe of an oscilloscope is held in contact with the output terminal of the arithmetic circuit 31 to display the waveform of the output signal thereof on the cathode-ray tube of the oscilloscope. Then, the rheostat 61 is adjusted so that the maximum amplitude of the displayed waveform is brought into synchronism with a certain comparative maximum amplitude.

The information reproducing apparatus shown in FIG. 1 suffers various shortcomings. The manual adjusting process required by the apparatus is tedious and time-consuming. Since the optical system and the signal processing system are mounted on the respective printed-circuit boards, if one of the systems is replaced with a new system, then the overall apparatus has to be manually adjusted again When the optical head 30 is repaired or replaced, or the apparatus is otherwise subjected to characteristic changes or environmental changes such as temperature changes or the like, the offset voltage applied to the adder 60 varies. At this time, the initial setting of the rheostat 61 has to be changed in order to maintain a desired high level of focus servo accuracy.

OBJECTS AND SUMMARY OF THE INVENTION

It is an object of the present invention to provide an apparatus for recording information on and reproducing information from an optical disc, which apparatus requires no manual adjustments when one of an optical system and a signal processing system is replaced, and also allows highly accurate automatic focusing operation even when the apparatus is subjected to characteristic changes, e.g., the optical head is repaired or replaced, or the apparatus is subjected to environmental changes such as temperature changes or the like.

According to the present invention, there is provided an apparatus for recording information in and/or reproducing information from an optical disc having a plurality of pairs of wobble pits disposed one on each side of the center of a track on the optical disc and spaced from each other along the track, the apparatus comprising an optical head for applying a convergent light beam to the optical disc and detecting a light beam returning from the optical disc, the optical head having an objective lens for passing the light beams therethrough, and an actuator for moving the objective lens along an optical axis thereof, focus error detecting means for producing a focus error signal indicative of a deviation of the convergent light beam from a focused condition thereof on the optical disc, arithmetic means for calculating the average of peak values of a reproduced signal produced when the light beam returns from the respective wobble pits, and control means for adding a bias which maximizes the absolute value of the average calculated by the arithmetic means, to the focus error signal from the focus error detecting means, thereby producing a sum signal, and for controlling the actuator to move the objective lens based on the sum signal.

According to the present invention, there is also provided a focus servo apparatus for focusing a light beam from a light beam source to an optical disc having a plurality of pairs of wobble pits disposed one on each side of the center of a track on the optical disc and spaced from each other along the track, the focus servo apparatus comprising an objective lens for converging the light beam onto the optical disc, an actuator for moving the objective lens along an optical axis thereof to apply the light beam in a focused condition to the optical disc, light detecting means for detecting a light beam returning from the optical disc when the light beam is applied from the light beam source through the objective lens to the optical disc, focus error detecting means for producing a focus error signal indicative of a deviation of the convergent light beam from a focused condition thereof on the optical disc, based on the light beam detected by the light detecting means, focus servo means for controlling the actuator to move the objective lens along the optical axis based on the focus error signal produced by the focus error detecting means, arithmetic means for calculating the average of peak values of the light beam detected by the light detecting means when the light beam returns from the respective wobble pits, and control means for adding a bias which maximizes the absolute value of the average calculated by the arithmetic means, to the focus error signal from the focus error detecting means, thereby producing a sum signal, and for controlling the actuator to move the objective lens based on the sum signal.

The above and other objects, features, and advantages of the present invention will become apparent from the following detailed description of an illustrative embodiment thereof to be read in conjunction with the accompanying drawings, in which like reference numerals represent the same or similar objects.

BRIEF DESCRIPTION OF THE DRAWINGS

FIG. 7(A-C) is a diagram showing reproduced signals indicative of tracking pits;

FIGS. 9 and 10(A,B) are flowcharts showing an automatic sequence of adjusting an offset in a focus servo process.

DETAILED DESCRIPTION OF THE PREFERRED EMBODIMENT

Figure 2:
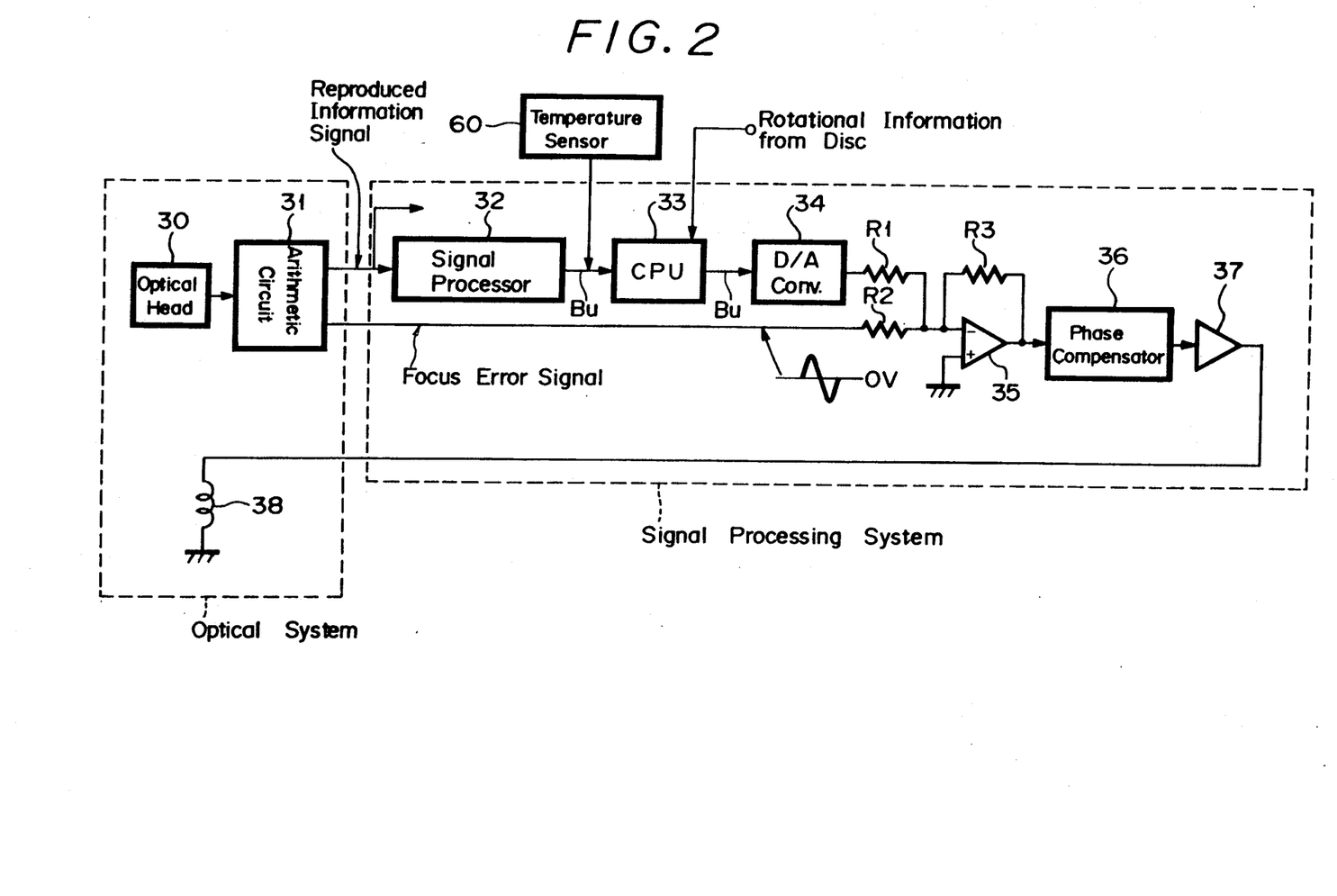
FIG. 2 is a block diagram of an apparatus for reproducing information from an optical disc, according to an embodiment of the present invention.

FIG. 2 shows an apparatus an apparatus for recording information and/or reproducing information from an optical disc. The optical disc used in the apparatus is actually a magnetooptic disc from which recorded information can be erased. However, any of other optical discs may be employed in the apparatus according to the present invention.

In FIG. 2, an optical head 30 applies a laser beam to an optical disc (not shown) which stores recorded information. The applied laser beam is reflected by the magnetooptic disc while being modulated by the recorded information, and detected by the optical head 30. A detected signal from the optical head 30 is processed by an arithmetic circuit 31, which produces a reproduced information signal and an focus error signal represented by an S-shaped characteristic curve. A signal processor 32 extracts a reproduced signal representative of wobble pits (described later on) from the reproduced signal from the arithmetic circuit 31, and processes the extracted signal. A processed signal from the signal processor 32 is then applied to a CPU 33 through a bus assembly Bu which comprises a data bus, an address bus, and a control bus. The CPU 33 produces a bias or offset depending on an in-focus information signal based on the processed signal from the signal processor 32, and supplies the offset through a D/A converter 34 and a resistor R1 to an operational amplifier 35. The focus error signal from the arithmetic circuit 31 is also supplied to the operational amplifier 35 through a resistor R2.

The CPU 33 is supplied with a temperature signal from a temperature sensor 60 disposed within the apparatus, and also with a rotation signal representing rotational information of the magnetooptic disc. The rotation signal may be produced by a frequency generator coupled to a spindle motor which rotates the magnetooptic disc or may be derived from the reproduced signal from the magnetooptic disc.

The output terminal of the operational amplifier 35 is connected to one of the input terminals through a resistor R3 for negative feedback. The operational amplifier 35 applies an output signal or control voltage signal through a phase compensator 36 and a buffer amplifier 37 to a focus actuator 38. The focus actuator 38 moves an objective lens 6 (see FIG. 3) of the optical head 30 along its optical axis over an interval depending on the voltage represented by the control voltage signal, until the laser beam emitted from the optical head 30 is sharply focused on the optical disc. Therefore, the objective lens 6 of the optical head 30 is controlled in a focus servo control loop.

A magnetooptic disc of sampled format configuration will be described below with reference to FIG. 8. FIG. 8 shows a recording region along a track of the magnetooptic disc. The recording region is divided into a plurality of sectors each associated with a sector mark. The track has, on its hypothetical central line, identification pits Gp for distinguishing the track from adjacent tracks, the identification pits Gp being produced on the basis of the Gray code used for track access, and a clock pit Cp for generating a timing signal to read data. Data to be recorded or recorded data are represented by pits which are disposed on the hypothetical central line of the track downstream of the identification pits Gp in the direction (indicated by the arrow a) in which a light beam spot Li generated by the optical head and applied to the disc moves along the track. In order to record the data or reproduce the recorded data along the hypothetical central line of the track, it is necessary to control the optical beam spot Li to follow the track in a tracking servo process. A tracking error signal for the tracking servo process is obtained by a pair of wobble pits Tp positioned one on each side of and displaced or offset from the hypothetical central line of the track by ¼ of the track pitch. The wobble pits Tp are spaced from each other along the track. When the light beam spot Li moves exactly on the hypothetical central line of the track, the two peak values of a detected output signal which is produced by the optical head as the light beam spot Li goes past the wobble pits Tp are equal to each other. However, when the light beam spot Li is displaced (upwardly or downwardly in FIG. 8) from the hypothetical central line of the track, one of the peak values of a detected output signal produced as the light beam spot Li moves past the wobble pits Tp is greater than the other. Therefore, a tracking error signal can be obtained as the difference between the two peak values as described above (see also FIG. 7).

Figure 3:
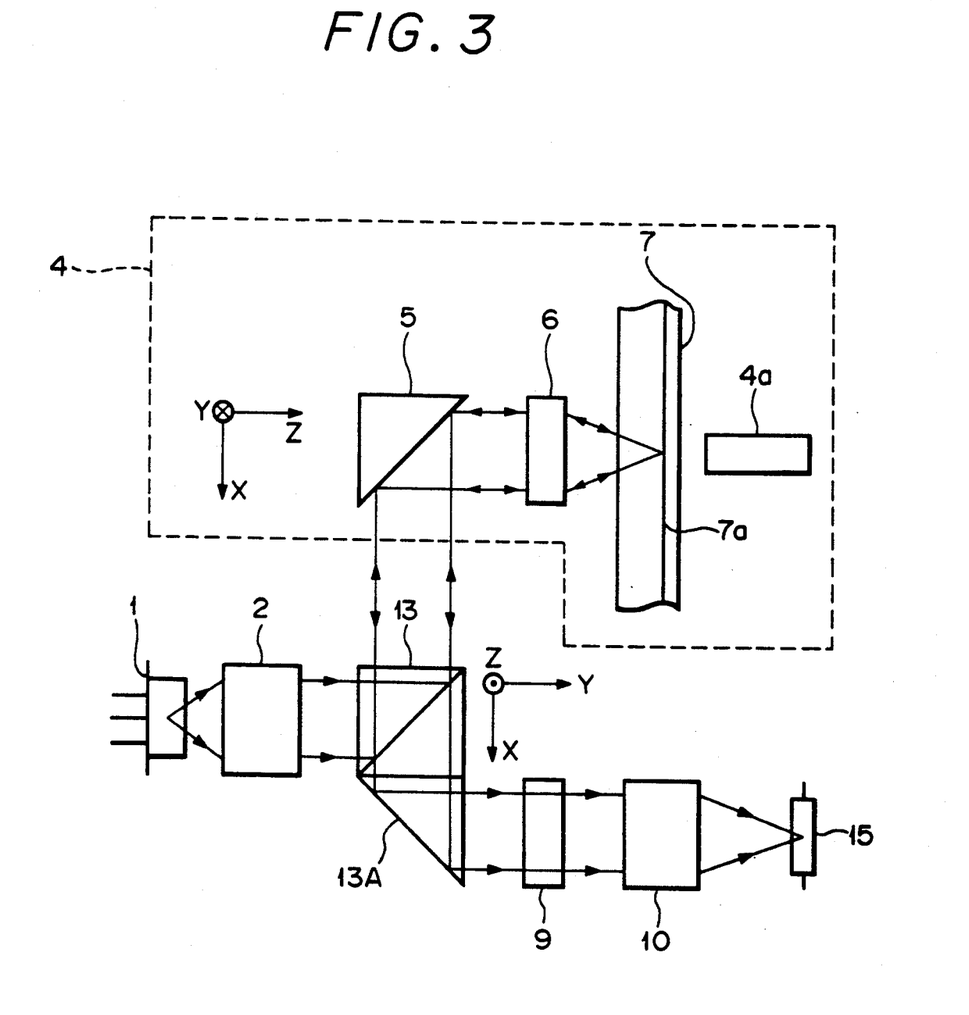
FIG. 3 is a detailed block diagram of an optical head in the apparatus shown in FIG. 2.

The optical head 30 shown in FIG. 2 will be described below in greater detail with reference to FIG. 3. In FIG. 3, there is established a cartesian coordinate system whose X and Y axes define a plane parallel to the sheet of FIG. 3 and whose Z axis is perpendicular to the sheet of FIG. 3 and extends toward the viewer of FIG. 3.

As shown in FIG. 3, the optical head 30 includes a semiconductor laser 1, which may be a laser diode, for emitting a laser beam in the +Y direction. The laser beam from the semiconductor laser 1 is converted by a collimator lens 2 into a parallel beam, which is then applied to a semireflecting mirror of a beam splitter 13. The beam splitter 13 comprises a pair of glass prisms each having a cross-sectional shape in the form of an isosceles triangle, and is joined to a glass prism 13A having a cross-sectional shape in the form of an isosceles triangle. The beam is reflected by the semireflecting mirror of the beam splitter 13 and emitted therefrom as a linearly S-polarized beam in the −X direction.

The optical head includes an optical assembly 4 enclosed by a broken line, the optical assembly 4 comprising another prism 5 and an objective lens 6 on one side of a magnetooptic disc 7. The optical assembly 4 is shown in the X-Y plane in FIG. 3, but actually lie in the X-Z plane as indicated. The linearly S-polarized beam reflected by the beam splitter 13 is reflected by a reflecting surface of the prism 5, which is also of a cross-sectional shape in the form of an isosceles triangle, to travel in the +Z direction. Then, the beam is converged by the objective lens 6 and applied to a perpendicularly magnetized film 7a of the magnetooptic disc 7, by which the beam is reflected in the −Z direction. The plane of polarization of the reflected beam is slightly rotated with respect to that of the beam before it is reflected by the perpendicularly magnetized film 7a. At the same time, the reflected beam becomes an elliptically polarized beam.

The divergent beam which is reflected in the −Z direction by the perpendicularly magnetized film 7a is then converted by the objective lens 6 into a parallel beam, which is reflected by the reflecting surface of the prism 5 to travel in the +X direction. The beam passes through the beam splitter 13 and then enters the prism 13A. The beam is then reflected by the reflecting surface of the prism 13A to travel in the +Y direction. The reflected beam then goes through a λ/2 plate 9 which has an optical axis extending at 22.5° with respect to the plane of polarization of the linearly S-polarized beam. The beam is converted by the λ/2 plate 9 into a beam which is composed of an S-polarized component and a P-polarized component (these components have equal amplitudes when no signal is carried by the beam). The beam from the λ/2 plate 9 is applied to and converged by a condensing lens 10. The convergent beam from the condensing lens 10 is applied to a light detector 15.

To record information on the magnetooptic disc 7, a convergent laser beam coming from the objective lens 6 is focused on the perpendicularly magnetized film 7a under a magnetic field which is generated by an external magnetic field generator 4a aligned with the optical axis of the objective lens 6 and disposed on the opposite side of the magnetooptic disc 7 remotely from the objective lens 6.

The magnetooptic disc 7 is supported on a spindle (not shown) coupled to the spindle motor, referred to above. The spindle and the spindle motor jointly constitute a disc drive mechanism for rotating the magnetooptic disc 7 about its own axis.

Figure 4:
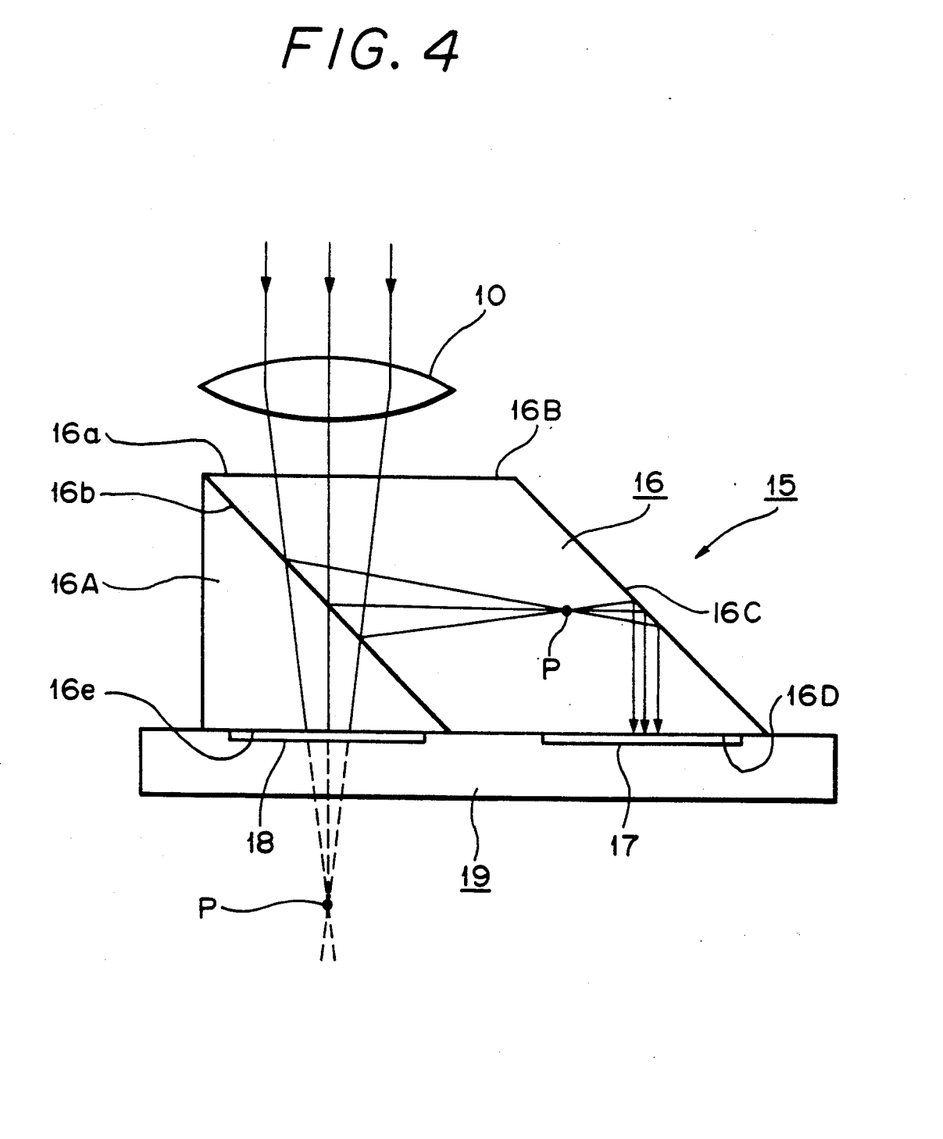
FIG. 4 is an enlarged view of a light detector in the optical head shown in FIG. 3.

The light detector 15 will be described in greater detail with reference to FIGS. 4 and 5. As shown in FIG. 4, the light detector 15 comprises a polarizing beam splitter 16 and a photodetector assembly 19 which comprises a pair of photodetectors 17, 18 mounted on a single substrate. The polarizing beam splitter 16 comprises a glass prism 16A having a cross-sectional shape in the form of an isosceles triangle, and a glass prism 16B joined to the prism 16A and having a cross-sectional shape in the form of a parallelogram whose interior angles are 45° and 135°.

The convergent beam coming from the condensing lens 10 is applied to a surface 16a of the prism 16B which is spaced from the photodetector assembly 19. The polarizing beam splitter 16 includes a dielectric multilayer film 16b lying in the interface between the joined prisms 16A, 16B which extends at 45° to the surface 16a. The dielectric multilayer film 16b serves to pass the P-polarized component of the applied beam and to reflect the S-polarized component thereof.

The prism 16B has a surface 16c spaced from and extending parallel to the dielectric multilayer film 16b, for reflecting the S-polarized component of the beam which is reflected by the dielectric multilayer film 16b. The S-polarized component reflected by the surface 16c leaves the prism 16B through a surface 16d thereof. The P-polarized component which passes through the dielectric multilayer film 16b leaves the prism 16A through a surface 16e. The surfaces 16d, 16e lie flush with each other. The surfaces 16d, 16e are spaced at equal distances along optical axes from points P where the respective S- and P-polarized components of the beam having entered through the surface 16a are focused.

The photodetectors 17, 18 are held against the surfaces 16d, 16e, respectively, of the prisms 16B, 16A. As shown in FIG. 5, the photodetectors 17, 18 comprise three stripe-shaped segments 17A, 17B, 17C and three stripe-shaped segments 18D, 18E, 18F, respectively. The photodetectors 17, 18 are arranged such that the optical axes of the S- and P-polarized component beams are aligned respectively with the central segments 17B, 18E.

Figure 5:
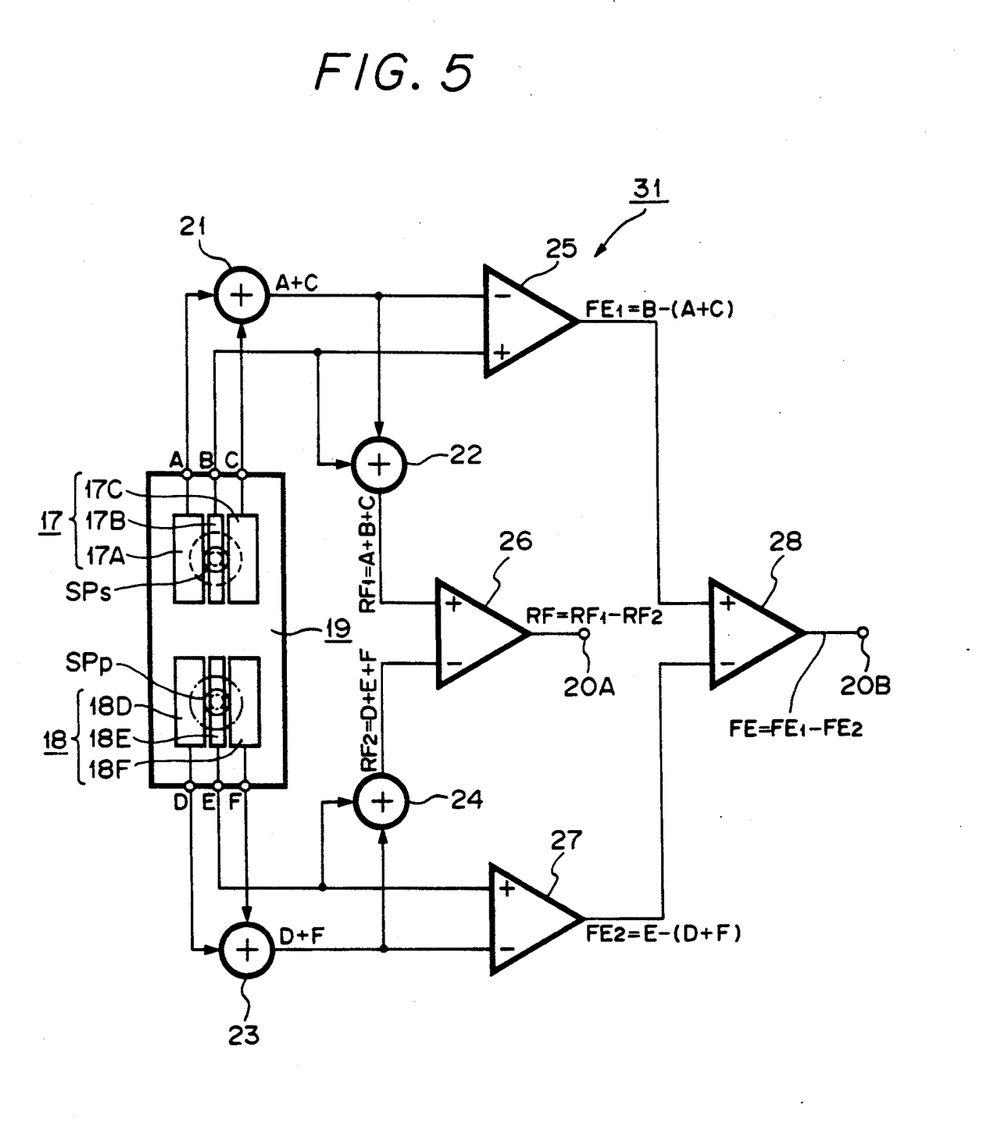
FIG. 5 is a block diagram of photodetectors and an arithmetic circuit.

The optical paths in the optical head 30 are adjusted in advance such that the convergent beam applied from the objective lens 6 to the perpendicularly magnetized film 7a is focused on the film 7a when spots SPs, SPp of the S- and P-polarized component beams falling on the photodetectors 17, 18 have the same diameter as indicated by the solid lines in FIG. 5. When the beam applied to the perpendicularly magnetized film 7a is brought out of focus on the film 7a, the diameters of the beam spots SPs, SPp on the photodetectors 17, 18 vary complementarily as indicated by the broken and dot-and-dash lines in FIG. 5. The photodetectors 17, 18 produce output signals depending on the diameters of the beam spots SPs, SPp, respectively.

FIG. 5 also shows the arithmetic circuit 31, which processes the output signals from the photodetectors 17, 18. It is assumed here that the photodetector segments 17A, 17B, 17C produce output signals A, B, C, respectively, and the photodetector segments 18D, 18E, 18F produce output signals D, E, F, respectively.

The arithmetic circuit 31 shown in FIG. 5 comprises adders 21, 22, 23, 24 and operational amplifiers 25, 26, 27, 28. The output signals A, C are added into a sum signal $A+C$ by the adder 21. The operational amplifier 25 subtracts the sum signal $A+C$ from the output signal B, thus producing a differential signal $FE1=B-(A+C)$. The output signals D, F are added into a sum signal $D+F$ by the adder 23. The operational amplifier 27 subtracts the sum signal $D+F$ from the output signal E, thus producing a differential signal $FE2=E-(D+F)$. The adder 22 adds the sum signal $A+C$ and the output signal B into a sum signal $RF1=A+B+C$, and the adder 24 adds the sum signal $D+F$ and the output signal E into a sum signal $RF2=D+E+F$. The operational amplifier 26 then subtracts the sum signal $RF2=D+E+F$ from the sum signal $RF1=A+B+C$, providing a differential signal $RF=RF1-RF2$. The differential signal $RF=RF1-RF2$ serves as a reproduced information signal indicative of the information recorded on the disc 7, the reproducing information signal being applied to an output terminal 20A. The operational amplifier 28 subtracts the differential signal FE2 from the differential signal FE1, thus providing a differential signal $FE=FE1-FE2$ which serves as a focus error signal that is applied to an output terminal 20B.

The signal processor 32 shown in FIG. 2 will be described below with reference to FIG. 6.

The signal processor 32 has an A/D converter 51 for converting a signal reproduced from the disc 7 and supplied from a input terminal T1 connected to the output terminal 20A (FIG. 5), into a digital signal, which is supplied directly to registers 49c, 49a, 49d, 49e, 49b, 49f and through a binary value converter 52 to a sync pattern detector 53.

The sync pattern detector 53 detects a sync pattern per segment (=18 bytes), and supplies a load control signal to a segment counter 54. When the sync pattern generator 53 detects a first sync pattern after initialization, the sync pattern generator 53 turns on a switch SW, closing a phase-locked loop and keeping it closed.

The segment counter 54 counts pulses of a clock signal (having a frequency of 12.3 MHz, for example) from a voltage-controlled oscillator 59. In response to the load control signal from the sync pattern detector 53, the segment counter 54 supplies its count to a decoder 55 and is initialized. Then, the decoder 55 supplies control signals to respective clock signal input terminals of the registers 49c, 49a, 49d, 49e, 49b, 49f. The information represented by the reproduced signal applied to the signal processor 32, which information is to be held by each of the registers 49c, 49a, 49d, 49e, 49b, 49f, is present a certain count of clock pulses after a sync pattern is detected.

Figure 7A:
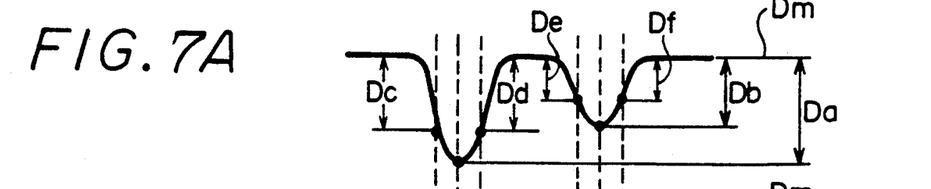
Figure 7B:
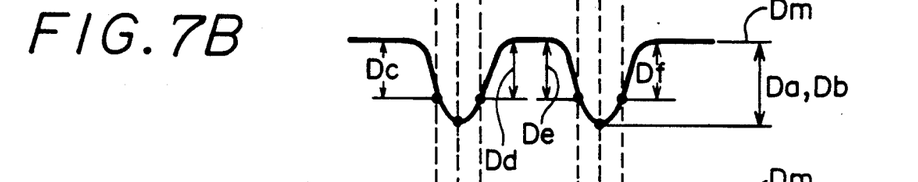
Figure 7C:
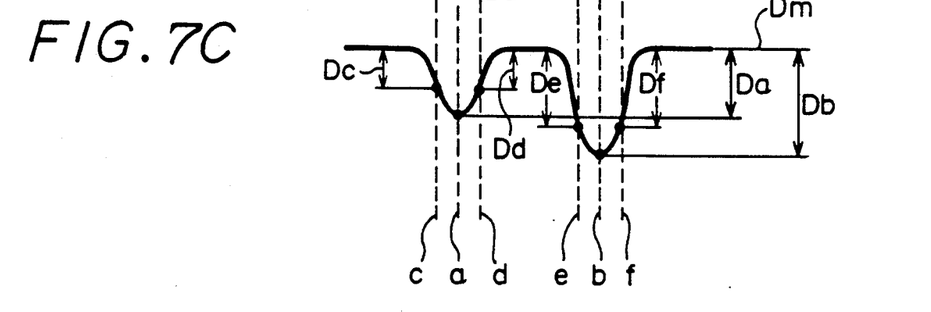
Figure 8:
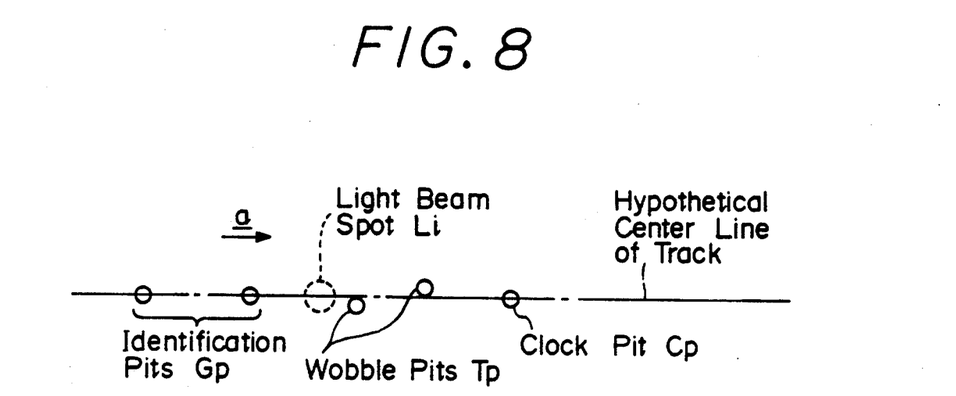
FIG. 8 is a schematic view of a recording region along a track of an optical disc.

The registers 49c, 49a, 49d, 49e, 49b, 49f are now supplied with, and hold, respective amplitude data Dc, Da, Dd, De, Db, Df at respective sampling points c, a, d, e, b, f on the waveform of the reproduced signal indicative of the wobble pits Tp, as shown in FIG. 7. The data Dc, Da, Dd, De, Db, Df are given with reference to a mirror level Dm. The sampling points a, b represent points where the reproduced signal indicative of the wobble pits Tp has a peak value. The sampling points c, d; e, f are located one on each side of the sampling points a, b. The intervals of time between the sampling points c and a, a and d, e and b, b and f are equal to each other.

A $(Da+Db)/2$ calculating unit 46 adds the data Da from the register 49a and the data Db from the register 49b into sum data, and multiplies the sum data by $\frac{1}{2}$, thus producing a signal $(Da+Db)/2$. The signal $(Da+Db)/2$ is then supplied through the bus assembly Bu to the CPU 33, as shown in FIG. 2. The disc 7 suffers reflectance irregularities, pit format irregularities, and other variations while it makes one revolution. In order to eliminate any drawback due to those irregularities, the CPU 33 reads the signal from the $(Da+Db)/2$ calculating unit 46 a certain number of times, e.g., 30 times during one revolution of the disc 7. The CPU 33 averages the signals thus read while the disc 7 is making two revolutions, i.e., averages the 60 sampled signals, and employs the average signal as in-focus information. Therefore, the disc 7 has thirty pairs, for example, of wobble pits Tp along one track.

The absolute value of the signal $(Da+Da)/2$ produced by the $(Da+Db)/2$ calculating unit 46 does not depend on whether the beam spot Li (FIG. 8) is running on or off track, but becomes maximum when the beam spot Li is properly focused on the surface of the disc 7.

Figure 6:
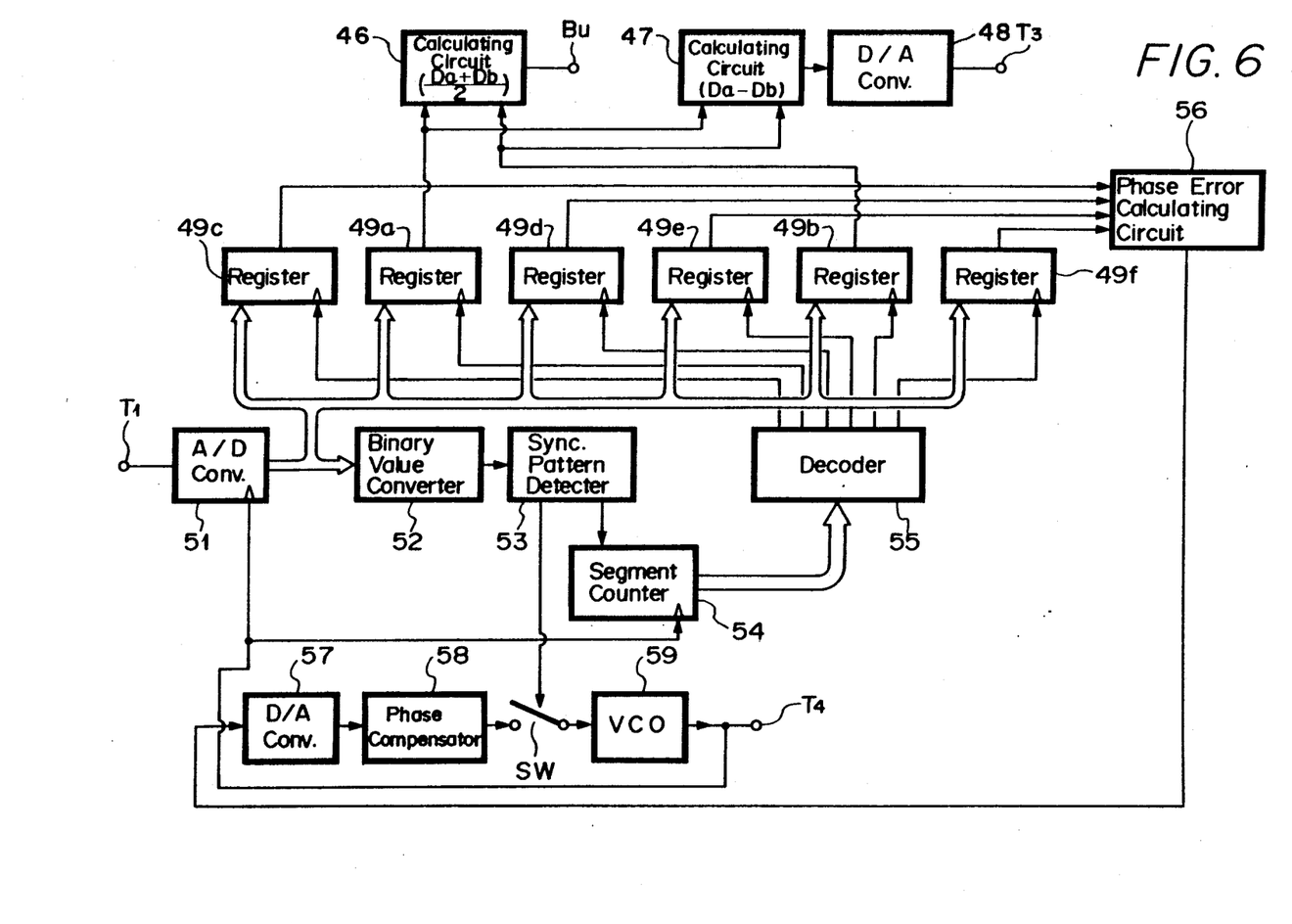
FIG. 6 is a block diagram of a signal processor.

As shown in FIG. 6, a $(Da-Db)$ calculating unit 47 subtracts the data Db from the data Da, and supplies a differential signal to a D/A converter 48. The D/A converter 48 converts the differential signal into an analog signal, which is applied as a tracking error signal to an output terminal T3.

As illustrated in FIG. 8, the wobble pits Tb are detected by the beam spot Li which is applied to the wobble pits Tb and scans the disc 7 along the track. If the wobble pits Tb are illuminated with equal intensities of the beam spot Li, then the amplitude data Da, Db obtained from the reproduced signal at the respective sampling points a, b are equal to each other, as shown in FIG. 7 at B. On the other hand if the wobble pits Tb are not illuminated with equal intensities of the beam spot Li, i.e., if the beam spot Li is not applied to the track exactly along the hypothetical central line thereof or exactly between the wobble pits Tb, then the amplitude data Da, Db differ from each other, as shown in FIG. 7 at A or C. At this time, the D/A converter 48 coupled to the $(Da-Da)$ calculating unit 47 produces a tracking error signal, as described above.

As shown in FIG. 6, the signal processor 32 further includes a phase error calculating unit 56 for subtracting the data Dd from the data Dc to produce differential data $(Dc-Dd)$, subtracting the data Df from the data De to produce differential data $(De-Df)$, adding the differential data $(Dc-Dd)$ and $(De-Df)$ into sum data $[(Dc-Dd)+(De-Df)]$, and multiplying the sum data $[(Dc-Dd)+(De-Df)]$ by $\frac{1}{2}$ to provide product data $[(Dc-Dd)+(De-Df)]/2$. The phase error calculating unit 56 supplies the data $[(Dc-Dd)+(De-Df)]/2$ as a frequency control signal to the voltage-controlled oscillator 59 through a D/A converter 57, a phase compensator 58, and the switch SW. The clock signal produced by the voltage-controlled oscillator 59 is supplied to an output terminal T4 and the clock signal input terminals of the A/D converter 51 and the segment counter 54.

An automatic process of adjusting an offset or bias voltage for the focus servo control loop, when the temperature in the recording and/or reproducing apparatus varies by 5° C., for example, and the optical head is replaced, after the beam spot is brought into focus, will be described below with reference to FIGS. 9 and 10.

Figure 9:
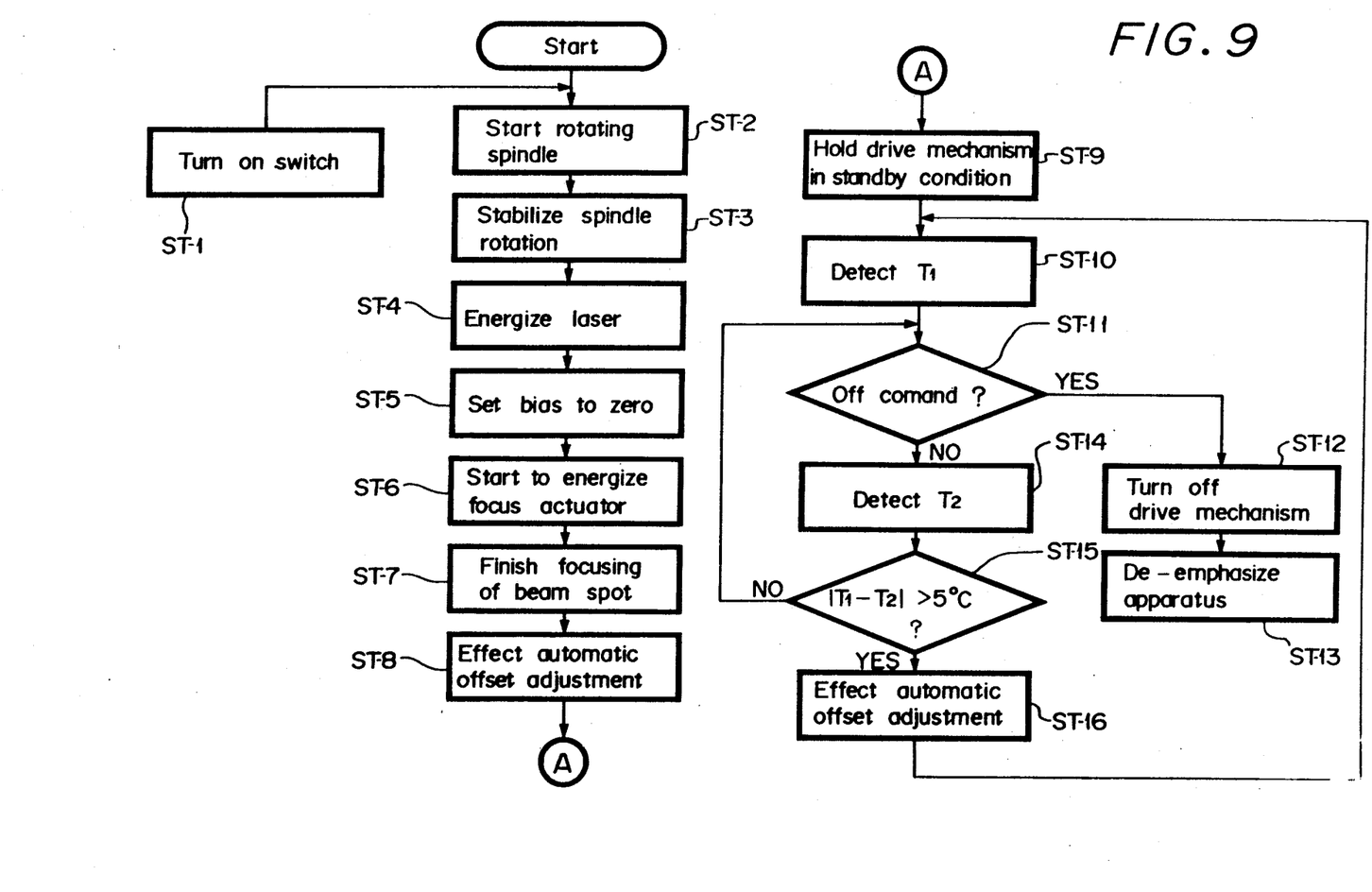
Figure 10A:
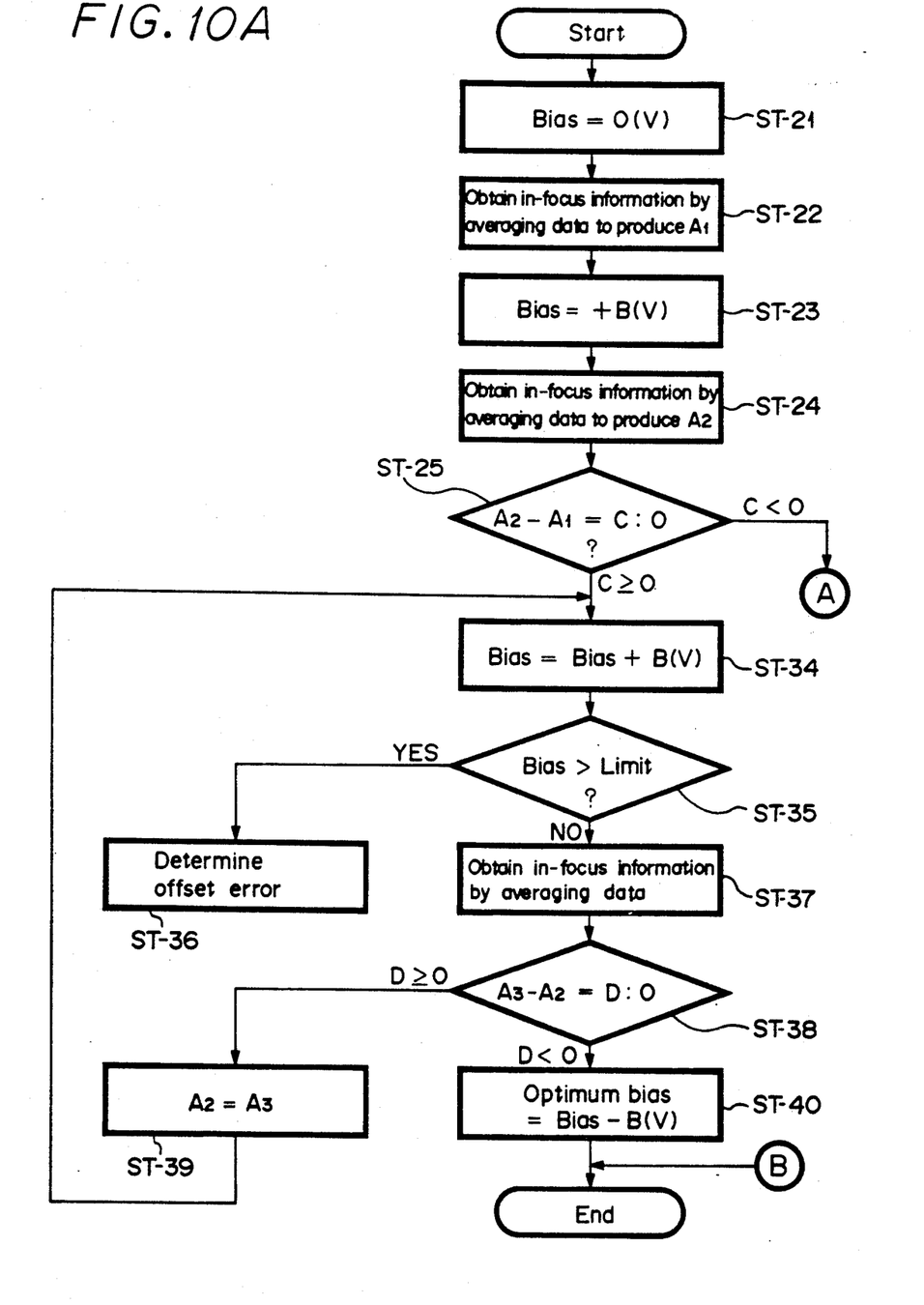
Figure 10B:
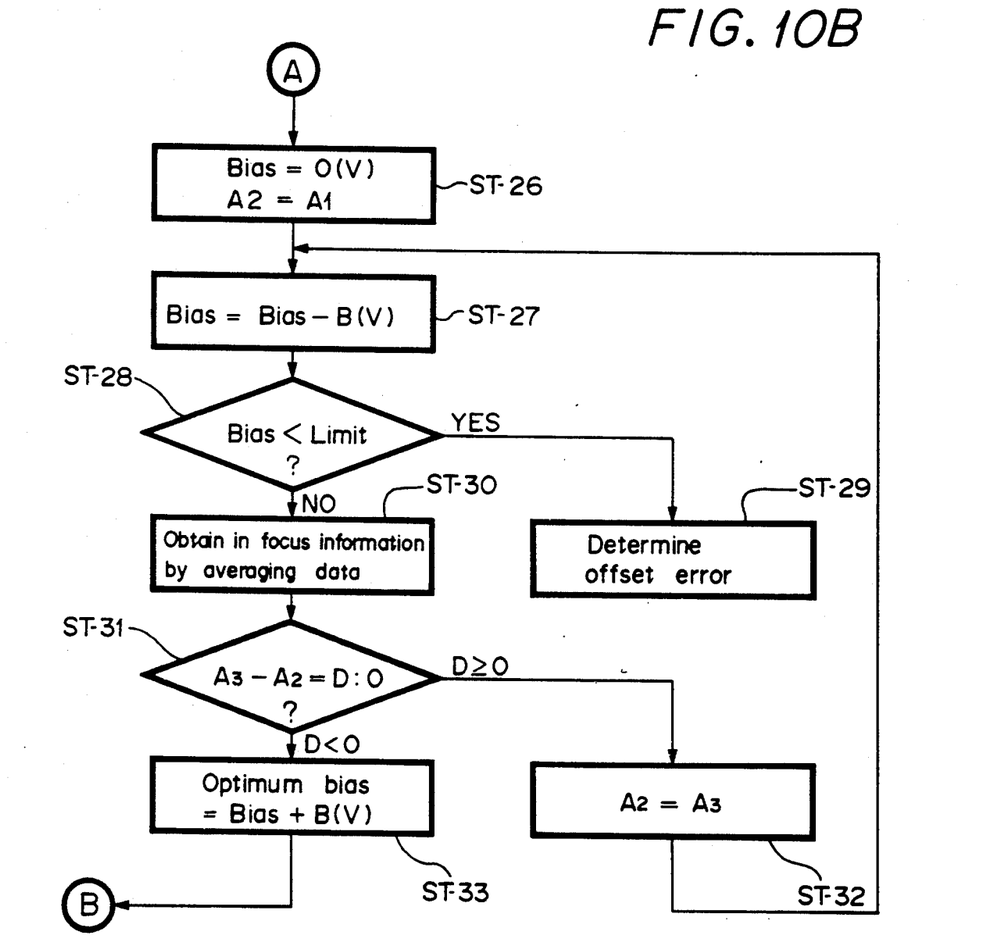

First, the power supply switch of the apparatus is turned on in a step ST-1 shown in FIG. 9. Then, the spindle motor is energized to start rotating the spindle for thereby rotating the magnetooptic disc 7 in a step ST-2. After the rotation of the spindle is stabilized in a step ST-3, the semiconductor laser 1 of the optical head 30 is energized to emit a laser beam in a step ST-4. Then, the output signal of the D/A converter 34, i.e., the bias voltage for the focus servo control loop, is set to 0 V in a step ST-5. The focus actuator 38 starts to be energized to move the objective lens 6 with respect to the disc 7 in a step ST-6.

After the beam spot on the disc 7 is brought into focus in a step ST-7, an automatic process of adjusting an offset or bias voltage is carried out in a step ST-8. This process will be described in detail later on with reference to FIG. 10. The offset adjusting process is effected while a tracking servo control loop is not in operation. Since the offset is adjusted using the value $(Da+Db)/2$, as described later, no problem arises irrespective of whether the tracking servo control loop is in operation or not. Stated otherwise, the offset can be adjusted while the tracking servo control loop is in operation.

After the step ST-8, the disc drive mechanism is brought into a standby condition in a step ST-9. The step ST-9 is followed by a step ST-10 in which the temperature in the recording and/or reproducing apparatus is detected and stored as T1 in a memory. For example, a temperature signal from the temperature sensor 60 (FIG. 2) is converted by an A/D converter (not shown) into a digital signal which is then supplied through the bus Bu to the CPU 33.

Then, a step ST-11 determines whether there is an OFF command for turning off the apparatus or not. If there is such an OFF command, then control goes to a step ST-12, and if not, then control goes to a step ST-14.

In the step ST-12, the disc drive mechanism is turned off. Thereafter, the apparatus is de-energized in a step ST-13.

The step ST-14 detects the temperature in the apparatus again and stores the detected temperature as T2 in the memory. A next step ST-15 determines whether the absolute value of the difference between the temperatures T1, T2 is greater than a preset temperature of 5° C. ($|T1-T2|>2$) or not. If not, then control returns to the step ST-11, and if yes, then control proceeds to a step ST-16. The preset temperature of 5° C. is given by way of illustrative example only, and may be other than 5° C. if necessary.

The step ST-16 effects an automatic process of adjusting the offset or bias voltage as with the step ST-8. Thereafter, control goes back to the step ST-10.

The automatic process of adjusting the offset for the focus servo control loop in the steps ST-8 and ST-16 will be described below with reference to FIG. 10.

First, the CPU 33 sets the output signal of the D/A converter 34, i.e., the bias voltage for the focus servo control loop, to 0 (V) in a step ST-21. Stated otherwise, the CPU 33 supplies a bias data signal of 0 (V) to the D/A converter 34.

Then, the CPU 33 obtains in-focus information in a step ST-22 by adding the data (Da+Db)/2 from the signal processor 32 sixty times, based on the rotational information supplied to the CPU 33, and dividing the sum data by 60, thus providing an average value A1. Since the data (Da +Db)/2 are produced thirty times per revolution of the disc 7 (i.e., each time the disc 7 is rotates through 12°), the data (Da+Db)/2 are added sixty times while the disc 7 is making two revolutions. By averaging the sum of the data (Da+Db)/2, it is possible to remove adverse effects which would otherwise be caused by RF signal noise, reflectance irregularities of the disc 7, and wobble pit format irregularities.

In a next step ST-23, the CPU 33 sets the output signal of the D/A converter 34, i.e., the bias voltage for the focus servo control loop, to a unit voltage of +B (V). That is, the CPU 33 supplies a bias data signal of +B (V) to the D/A converter 34. Accordingly, the in-focus position, i.e., the position of the objective lens 6 to focus the beam spot sharply on the perpendicularly magnetized film 7a of the disc 7, is offset or shifted a distance corresponding to the voltage +B (V).

In a step ST-24, the CPU 33 obtains in-focus information by adding the data (Da+Db)/2 from the signal processor 32 sixty times, based on the rotational information supplied to the CPU 33, and dividing the sum data by 60, thus providing an average value A2, as in the step ST-22.

The CPU 33 then determines in a step ST-25 whether difference (A2−A1) between the average value A2 and the average value A1 is smaller than 0 or not. If the difference (A2−A1) is smaller than 0, then control goes to a step ST-26, and if the difference (A2−A1) is equal to or greater than 0, then control goes to a step ST-34.

In the step ST-26, the CPU 33 sets the bias voltage for the focus servo control loop to 0 (V) and employs the average value A1 calculated in the step ST-22 instead of the average value A2 calculated in the step ST-24. Inasmuch as the CPU 33 supplies a bias data signal of 0 (V) to the D/A converter 34, the in-focus position is shifted back to the initial position where the bias voltage for the focus servo control loop is 0 (V).

Then, in a step ST-27, the CPU 33 sets the present bias voltage for the focus servo control loop to a value which is produced by subtracting B (V) from the present bias voltage for the focus servo control loop. Thereafter, control goes to a step ST-28. The step ST-28 determines whether the bias voltage established in the step ST-27 is smaller than a limit value −L or not. If the bias voltage is smaller than the limit value −L, then control goes to a step ST-29 which determines that the automatic adjusting process suffers an offset error. At this time, the offset error may be reported to a host computer which is connected to the apparatus through an interface such as an SCSI or the like.

If the bias voltage is larger than the limit value −L in the step ST-28, then control goes to a step ST-30 in which the CPU 33 supplies the bias voltage established in the step ST-27 as a bias data signal to the D/A converter 34, and also calculates an average value A3 of the added data (Da+Db)/2 as in-focus information, as in the steps ST-22, ST-24.

In a next step ST-31, the CPU 33 calculates the difference $D(=A3-A2)$ between the average value A3 and the previously calculated average value A2, and determines whether the difference D is smaller than 0 or not. If the difference D is equal to or greater than 0, then control proceeds to a step ST-32, and if the difference D is smaller than 0, then control goes to a step ST-33.

In the step ST-32, the CPU 33 employs the average value A3 calculated in the step ST-30 instead of the previously calculated average value A2. Then, control goes back to the step ST-27. In the step ST-33, the CPU 33 establishes an optimum bias voltage as the sum of the present bias voltage and B (V), and sets the bias voltage to this optimum bias voltage. Thus, the bias voltage or the output voltage of the D/A converter 34 becomes an integral multiple of −B (V).

In the step ST-34, the CPU 33 sets the present bias voltage for the focus servo control loop to a value which is produced by adding B (V) to the present bias voltage for the focus servo control loop. Thereafter, control goes to a step ST-35. The step ST 35 determines whether the bias voltage established in the step ST-34 is larger than a limit value +L or not. If the bias voltage is larger than the limit value +L, then control goes to a step ST-36 which determines that the automatic adjusting process suffers an offset error. At this time, the offset error may be reported to a host computer which is connected to the apparatus through an interface such as an SCSI or the like.

If the bias voltage is smaller than the limit value +L in the step ST-35, then control goes to a step ST-37 in which the CPU 33 supplies the bias voltage established in the step ST-34 as a bias data signal to the D/A converter 34, and also calculates an average value A3 of the added data (Da+Db)/2 as in-focus information, as in the steps ST-22, ST-24.

In a next step ST-38, the CPU 33 calculates the difference $D(=A3-A2)$ between the average value A3 and the previously calculated average value A2, and determines whether the difference D is smaller than 0 or not. If the difference D is equal to or greater than 0, then control proceeds to a step ST-39, and if the difference D is smaller than 0, then control goes to a step ST-40.

In the step ST-39, the CPU 33 employs the average value A3 calculated in the step ST-37 instead of the previously calculated average value A2. Then, control goes back to the step ST-34. In the step ST-40, the CPU 33 establishes an optimum bias voltage as the difference between the present bias voltage and B (V), and sets the bias voltage to this optimum bias voltage. Thus, the bias voltage or the output voltage of the D/A converter 34 becomes an integral multiple of +B (V).

Although a certain preferred embodiment has been shown and described, it should be understood that many changes and modifications may be made therein without departing from the scope of the appended claims.

I claim as my invention:

1. An apparatus for recording information in and/or reproducing information from an optical disc having a plurality of pairs of wobble pits disposed one on each side of the center of a track on the optical disc and spaced from each other along the track, said apparatus comprising:

an optical head for applying a convergent light beam to the optical disc and detecting a light beam returning from the optical disc, said optical head having an objective lens for passing the light beams therethrough, and an actuator for moving said objective lens along an optical axis thereof;

focus error detecting means for producing a focus error signal indicative of a deviation of the convergent light beam from a focused condition thereof on the optical disc;

arithmetic means for calculating the average of peak values of a reproduced signal produced when the light beam returns from the respective wobble pits; and control means for adding a bias which maximizes the absolute value of said average calculated by said arithmetic means, to the focus error signal from said focus error detecting means, thereby producing a sum signal, and for controlling said actuator to move said objective lens based on said sum signal.

2. An apparatus according to claim 1, wherein said control means comprising means for setting said bias to zero before said actuator is controlled to move said objective lens to bring said convergent light into the focused condition on the optical disc.

3. An apparatus according to claim 1, further comprising temperature detecting means for detecting a temperature in the apparatus, said control means comprising means for controlling said bias based on the temperature detected by said temperature detecting means.

4. An apparatus according to claim 1, wherein said arithmetic means comprises means for calculating the average of peak values of the reproduced signal produced when the light beam returns from the respective wobble pits while the optical disc is making one revolution.

5. A focus servo apparatus for focusing a light beam from a light beam source to an optical disc having a plurality of pairs of wobble pits disposed one on each side of the center of a track on the optical disc and spaced from each other along the track, said focus servo apparatus comprising:

an objective lens for converging the light beam onto the optical disc;

an actuator for moving said objective lens along an optical axis thereof to apply the light beam in a focused condition to the optical disc;

light detecting means for detecting a light beam returning from the optical disc when the light beam is applied from the light beam source through said objective lens to the optical disc;

focus error detecting means for producing a focus error signal indicative of a deviation of the convergent light beam from a focused condition thereof on the optical disc, based on the light beam detected by said light detecting means;

focus servo means for controlling said actuator to move said objective lens along the optical axis based on the focus error signal produced by said focus error detecting means;

arithmetic means for calculating the average of peak values of the light beam detected by said light detecting means when the light beam returns from the respective wobble pits; and control means for adding a bias which maximizes the absolute value of said average calculated by said arithmetic means, to the focus error signal from said focus error detecting means, thereby producing a sum signal, and for controlling said actuator to move said objective lens based on said sum signal.

6. A focus servo apparatus according to claim 5, wherein said control means comprising means for setting said bias to zero before said actuator is controlled to move said objective lens to bring said convergent light into the focused condition on the optical disc.

7. A focus servo apparatus according to claim 5, further comprising temperature detecting means for detecting a temperature in the apparatus, said control means comprising means for controlling said bias based on the temperature detected by said temperature detecting means.

8. A focus servo apparatus according to claim 5, wherein said arithmetic means comprises means for calculating the average of peak values of the reproduced signal produced when the light beam returns from the respective wobble pits while the optical disc is making one revolution.

* * * * *